United States Patent
Pisanu et al.

(10) Patent No.: US 12,480,849 B2
(45) Date of Patent: Nov. 25, 2025

(54) BIOREACTOR DEVICE DETERMINING PROPERTIES OF BIOLOGICAL SAMPLE, HAS HOLDING ELEMENT AND CANTILEVER

(71) Applicant: UNIVERSITÄT BASEL, Basel (CH)

(72) Inventors: Alessia Pisanu, Huningue (FR); Anna Marsano, Binningen (CH); Giuseppe Isu, Turin (IT); Conradin Döbelin, Liestal (CH); Giuseppe Pisani, Bülach (CH)

(73) Assignee: UNIVERSITÄT BASEL, Basel (CH)

( * ) Notice: Subject to any disclaimer, the term of this patent is extended or adjusted under 35 U.S.C. 154(b) by 840 days.

(21) Appl. No.: 17/598,346

(22) PCT Filed: Mar. 27, 2020

(86) PCT No.: PCT/EP2020/058819
§ 371 (c)(1),
(2) Date: Sep. 27, 2021

(87) PCT Pub. No.: WO2020/193777
PCT Pub. Date: Oct. 1, 2020

(65) Prior Publication Data
US 2022/0187176 A1    Jun. 16, 2022

(30) Foreign Application Priority Data
Mar. 28, 2019 (EP) .................................... 19165964

(51) Int. Cl.
*G01N 3/08* (2006.01)
*C12M 1/00* (2006.01)
*C12M 1/42* (2006.01)

(52) U.S. Cl.
CPC ....... *G01N 3/08* (2013.01); *G01N 2203/0017* (2013.01); *G01N 2203/0019* (2013.01); *G01N 2203/04* (2013.01)

(58) Field of Classification Search
CPC ............. G01N 3/08; G01N 2203/0017; G01N 2203/0019; G01N 2203/04;
(Continued)

(56) References Cited

U.S. PATENT DOCUMENTS

| 5,153,136 | A | 10/1992 | Vandenburgh |
| 2019/0276785 | A1* | 9/2019 | Vunjak-Novakovic ..................... C12M 1/34 |
| 2020/0255789 | A1* | 8/2020 | Dendorfer ............... G01L 1/127 |

FOREIGN PATENT DOCUMENTS

| EP | 3176252 | 6/2017 |
| WO | 2018013851 | 1/2018 |

OTHER PUBLICATIONS

Kensah et al., "A Novel Miniaturized Multimodal Bioreactor for Continuous In Situ Assessment of Bioartificial Cardiac Tissue During Stimulation and Maturation", Tissue Engineering, vol. 17, No. 4, 2011, p. 463-473.
(Continued)

*Primary Examiner* — Brandi N Hopkins
(74) *Attorney, Agent, or Firm* — JMB Davis Ben-David

(57) ABSTRACT

Described herein is an apparatus (100) for determining properties of a sample (110) arranged in at least one receptacle (130) of a container device (120). The apparatus (100) comprises an actuator (30) which is configured to be coupled to the sample (110) via at least one holding element (34) which is configured to hold the sample (110). Further, the actuator (30) is configured to apply a mechanical stimulus to the sample (110) via the at least one holding element (34). The apparatus (100) comprises a force sensing device (20) which is configured to be coupled to the sample (110) via at
(Continued)

Figure 1:
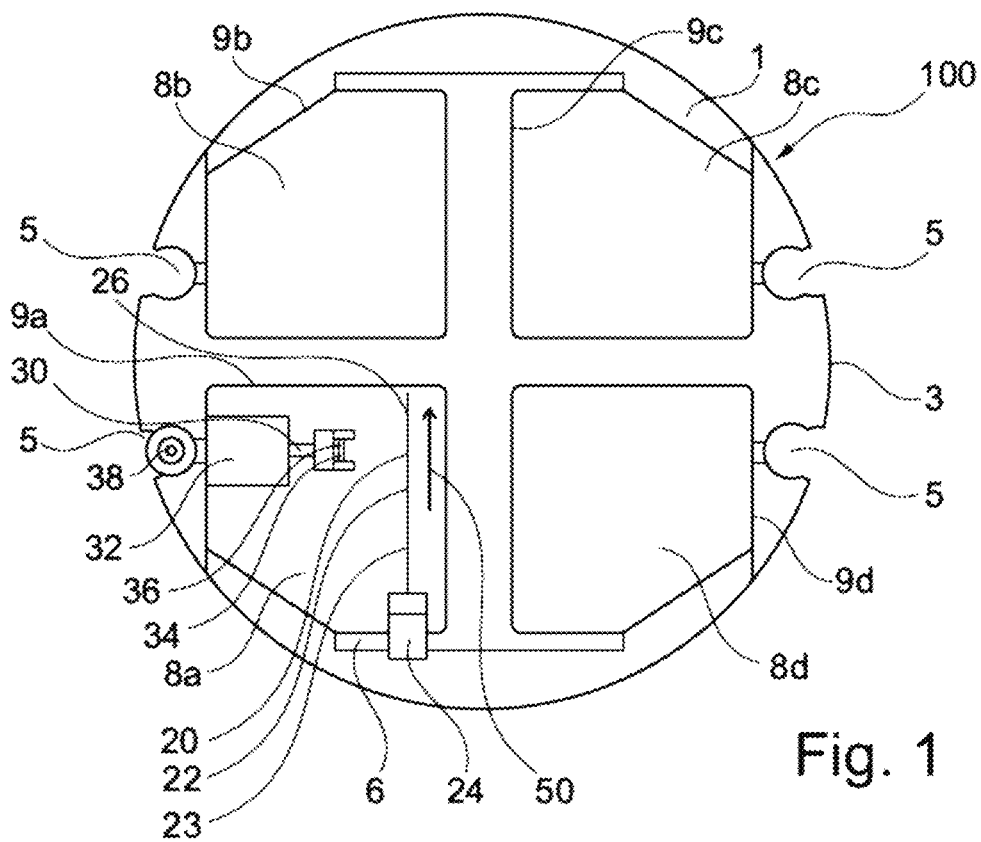

least one cantilever (22). Further, the apparatus (100) comprises a frame (1), wherein the actuator (30) and the force sensing device (20) are configured to be mounted to the frame (1).

20 Claims, 7 Drawing Sheets

(58) Field of Classification Search
CPC .......... G01N 33/4833; G01N 21/8483; G01N 29/032; G01N 3/20; G01N 11/16; G01N 3/38; G01N 21/65; G01N 3/24; G01B 11/25; B01L 3/502715; G01Q 60/03; G01L 1/24
See application file for complete search history.

(56) References Cited

OTHER PUBLICATIONS

Chu Duc T et al, "Piezoresistive Cantilever Beam for Force Sensing in Two Dimensions", IEEE Sensors Journal, IEEE Service Center, New York, NY, US, vol. 7, No. 1, Jan. 1, 2007 (Jan. 1, 2007), p. 96-104.

* cited by examiner

BIOREACTOR DEVICE DETERMINING PROPERTIES OF BIOLOGICAL SAMPLE, HAS HOLDING ELEMENT AND CANTILEVER

CROSS-REFERENCE TO RELATED APPLICATIONS

This is the U.S. National Stage of International Patent Application No. PCT/EP2020/058819 filed on Mar. 27, 2020, which claims priority to European Patent application Ser. No. 19/165,964.8 filed on Mar. 28, 2019.

The invention relates to an apparatus for determining properties of a sample.

To determine properties of a sample, a bioreactor can be used. A bioreactor is a device in that a sample, in particular a biological sample, e.g. cells or a tissue, is grown under controlled conditions. With controlled conditions for example a specific substrate concentration, temperature and/or pH is meant.

Bioreactors are also used in the context of tissue engineering. Tissue engineering comprises the artificial generation of biological tissues by the cultivation of cells for the formation of new viable tissue in particular for a medical purpose e.g. in order to replace or regenerate diseased tissue in a patient.

For its proper functioning, an engineered tissue requires specific mechanical, biochemical and/or structural properties. This comprises an appropriate response of the engineered tissue towards an applied chemical, mechanical, and/or electrical stimulus.

A mechanical stimulus particularly comprises the stretching and/or compression of the sample. A chemical stimulation comprises an application of a chemical compound and/or a hormone.

According to prior art, different embodiments of a bioreactor have been published that enable the application of mechanical stimuli to a sample.

Exemplarily, U.S. Pat. No. 7,410,792B2 discloses a bioreactor comprising at least a bioreactor chamber, a holding device, an actuator, a microprocessor-based control system and multiple sensors, wherein some of the sensors are used to detect the displacement of a sample in response to a mechanical stimulus that is realized by the actuator.

Kensah and colleagues published a bioreactor that enables a mechanical stimulation of an engineered cardiac tissue sample, the real-time measurement of the force exerted by the sample, in particular the contractile force, and the inspection of the sample by means of a microscope [Kensah et al. (2011), "A Novel Miniaturized Multimodal Bioreactor for Continuous In Situ Assessment of Bioartificial Cardiac Tissue During Stimulation and Maturation", Tissue Engineering: Part C, Vol. 17(4), pp. 463-473.]. The force is measured via a bending beam load cell which enables a force measurement in the range of 0 N to 1 N.

In the field of tissue engineering, the possibility to sense small forces, in particular forces about 1 mN, is essential. To reach the required sensitivity, expensive and complex technical solution approaches are commonly used, for example commercially available bioreactors such as TC-3 (Ebers), Bose electroforce bioreactor (Bose), Mechanoculture T6 (WPI), and others. Those devices guarantee great accuracy in delivering mechanical stimulation by means of more or less complex linear actuators and/or measuring mechanical properties by conventional load cells. Nevertheless, these devices were conceived for big constructs, requiring big volume of culture medium together with high number of cells for a single replicate. Moreover, these devices cannot be integrated in an easy way to standard cell culture procedures and/or conventional microscopy.

Hence, there is a need to provide a device that provides a growth of cells or a tissue under controlled conditions, wherein moreover at least one stimulus can be applied to the sample, in particular a mechanical, electrical and/or chemical stimulus, and wherein the sample's response to that stimulus can be detected in an easy, cost-effective and user-friendly manner.

This is solved by the apparatus, system, microscope and method described herein. Embodiments of these aspects of the present invention are stated in the corresponding claims and sub claims and are described below.

A first aspect of the invention is related to an apparatus for determining properties of a sample, wherein the sample is arranged in at least one receptacle of a container device. The apparatus comprises an actuator which is configured to be coupled to the sample through at least one holding element. The at least one holding element is configured to hold the sample. The actuator is configured to apply a mechanical stimulus to the sample via the at least one holding element. The apparatus comprises a force sensing device which is configured to be coupled to the sample via at least one cantilever. Further, the apparatus comprises a frame. The actuator and the force sensing device are configured to be mounted to the frame, and the frame is configured to be arranged on the container device. When the actuator and the force sensing device are mounted to the frame, the at least one holding element and the at least one cantilever are arranged in the at least one receptacle when the frame is arranged on the container device.

Particularly, the apparatus is configured to determine properties of biological tissues and/or engineered tissues including but not limited to cardiac tissue, skeletal muscle tissue, cartilage, ligaments and tendons. In particular, the apparatus is configured to determine properties of engineered tissues grown on a scaffold, particularly grown on a hydrogel. Such a hydrogel is configured to mimic the microenvironment of cells. A hydrogel is commonly used in 3D tissue engineering.

The apparatus comprises a frame. The frame can consist of a biocompatible material. In an embodiment, the frame can comprise or consist of a plastic. The frame is configured such that it can be arranged on a container device that can comprise at least one receptacle.

Further, the actuator and the force sensing device are configured such that both can be mounted to the frame. The actuator and the force sensing device can be mounted to the frame independent of each other. The frame is configured such that in the case the actuator and the force sensing device are attached to the frame, the at least one cantilever and the at least one holding element can extend into the receptacle of the container device when the frame is arranged on the container device.

In other words this means that the frame and the container device as well as the frame and the at least one cantilever and the at least one holding element can be arranged in relation to each other such that the at least one cantilever and the at least one holding element are arranged in the at least one receptacle of the container device when the frame is arranged on said container device.

In an embodiment of the invention, the actuator comprises at least one holding element which is configured to be coupled to the sample. In an embodiment, the at least one holding element comprises a rod. The at least one holding element can particularly comprise a biocompatible material, in particular a biocompatible metal. In the context of the present application, the term "biocompatible" means that the material has no effect on the sample, in particular no disadvantageous effect. This includes that the material does not adversely affect the sample's properties including that it does not induce a local or global response of the sample.

For example, a biocompatible metal is tantalum, platinum, titanium or a titanium alloy, including an alloy of nickel and titanium. The invention is not limited to the aforementioned metals.

Further, in an embodiment, the at least one cantilever comprises a biocompatible material. In particular, the at least one cantilever comprises the same material as the at least one holding element. However, alternatively, the at least one cantilever can comprise a material different from the material the at least one holding element comprises.

The force sensing device, in particular the at least one cantilever, and the actuator, in particular the at least one holding element, are configured in such a way that a sample can be coupled to both of them. Particularly, the sample can be coupled to the at least one cantilever and the at least one holding element such that the sample extends between them.

If a sample comprises a hydrogel, the hydrogel can easily be coupled to the at least one cantilever and the at least one holding element such that the sample is coupled to the actuator and to the force sensing device.

In an alternative embodiment, the at least one cantilever and/or the at least one holding element comprise a clamp, in particular a soft clamp, which is configured to be coupled to the sample. A clamp can comprise a biocompatible material.

The longitudinal axis of the at least one cantilever extends in a first direction. The at least one cantilever particularly has a circular cross-section. An end of the at least one cantilever can be referred to as tip of the cantilever.

Particularly, according to an embodiment of the present invention, the invention comprises a cantilever with an average diameter between 0.2 mm and 1.5 mm, in particular between 0.203 mm and 1.016 mm. Particularly, according to a further embodiment, the invention comprises a cantilever with an average diameter between 0.25 mm and 1.5 mm, in particular between 0.406 mm and 1.016 mm. Further, the at least one cantilever can comprise a length along the longitudinal axis between 5 mm and 80 mm, in particular between 10 mm and 50 mm.

In an embodiment of the invention, the at least one cantilever is configured and arranged in such a way that a quick assembly and/or disassembly of the at least one cantilever is permitted such that a quick replacement of the at least one cantilever from the apparatus is provided. It includes that a first cantilever comprising a first average diameter can be replaced by a second cantilever with a second average diameter, wherein the first average diameter differs from the second average diameter. Likewise, a first cantilever comprising a first material can be replaced by a second cantilever comprising a second material which differs from the first material.

Particularly, in an embodiment, the apparatus comprises an attachment device for fastening the at least one cantilever to the apparatus, particularly to the frame, wherein the attachment device and/or the at least one cantilever are configured such that the at least one cantilever can be releasably fastened to the attachment device. The apparatus may comprise a plurality of different cantilevers which can be easily interchanged using said releasable fastening to the attachment device.

Particularly, the actuator and the force sensing device are positioned in such a way that the longitudinal axis of the at least one cantilever and the longitudinal axis of the at least one holding element, e.g. a rod, run parallel to each other. This arrangement has the advantage that the sample can be coupled to both the at least one cantilever and the at least one holding element in such a way that the sample is substantially positioned perpendicular to the longitudinal axes of the at least one cantilever and of the at least one holding element, in particular, that the sample's longitudinal axis is substantially positioned perpendicular to the longitudinal axes of the at least one cantilever and of the at least one holding element. However, the arrangement is not limited to such a perpendicular positioning.

In particular, the sample can have an elongated shape meaning that the sample extends along a longitudinal axis. However, the invention is not limited to a sample of elongated shape. The apparatus is also configured to determine properties of samples of almost circular, squared or each other shape. In these cases, one body axis is considered to be the sample's longitudinal axis.

Further, in an embodiment, the actuator is configured to generate a displacement (of the sample) along a second direction. In particular, the actuator is configured to generate a movement of the at least one holding element along the second direction. In the following, the direction of the displacement along the second direction is referred to as moving direction.

Further, in an embodiment of the present invention, the at least one cantilever and the actuator are configured and arranged in such a way that the second direction extends perpendicular to the first direction.

According to an embodiment of the present invention, the actuator is configured to apply a mechanical stimulus to the sample coupled to the actuator. In the context of the present application, a mechanical stimulus particularly means that the actuator, particularly the at least one holding element, is displaced such that it can generate a stretching and/or a compression of a sample coupled to the at least one holding element (and the at least one cantilever). In particular, the sample is stretched and/or compressed along its longitudinal axis, wherein the sample is particularly arranged such that its longitudinal axis extends along the second direction.

Further, according to an embodiment of the present invention, the actuator is configured in such a way that a movement (of the sample) along the second direction can be generated. In particular, a movement in the opposite direction can be realized which means that the moving direction can change its orientation. Consequently, the distance between the actuator, in particular the at least one holding element, and the at least one cantilever can be increased as well as decreased. In an embodiment, the actuator is configured in such a way that the orientation of the moving direction can be changed, particularly repeatedly changed so that e.g. the at least one holding element can be moved back and forth.

Particularly, using this embodiment, the sample that is coupled to the at least one holding element and the at least one cantilever can be stretched and/or compressed by means of the actuator. In particular, a continuous alternation of a stretching and a compression of the sample can be realized by means of an actuator which provides a continuous change of the orientation of the moving direction. In particular, the sample (coupled between the at least one holding element and the at least one cantilever) is stretched and/or compressed along its longitudinal axis.

In an embodiment, the apparatus is configured to generate a chemical stimulation of the sample. The chemical stimulation may comprise an application of a drug and/or a hormone.

In an embodiment, the frame comprises a contact surface. The contact surface is configured to be arrangeable on an upper side of the container device in case the frame is arranged on the respective container device. The force sensing device and the actuator are mountable to the frame such that when the frame is arranged on the container device the at least one cantilever and the at least one holding element are arranged in the at least one receptacle of the container device.

In an embodiment, the contact surface can extend in a contact plane.

In an embodiment, the contact plane extends perpendicular to the first direction. In an alternative embodiment, the contact plane extends parallel to the first direction.

The frame can be configured such that it can be fixed to the container device. This way, an inadvertent movement of the frame in relation to the container device can be prevented. An inadvertent movement of a non-fixed frame can disturb the measurements, in particular the force measurements. Therefore, the prevention of such a movement is advantageous.

In an embodiment, the frame can be fixed to the container device by a rigid interference coupling with no-play between the frame and the container device.

In an embodiment, the frame comprises at least one through-opening. The at least one through-opening can be limited by a wall. Said wall can form a lateral wall of at least one measurement cavity when the frame is arranged on the container device.

In a measurement cavity, a measurement (e.g. a force measurement) can take place. The at least one measurement cavity can form at least a part of a bioreactor chamber.

In an embodiment according to the invention, the frame can at least laterally limit the at least one measurement cavity.

In an embodiment, the frame comprises at least four through-openings, wherein each through-opening is limited by each one wall. When the frame is arranged on the container device, each wall forms a lateral wall of at least one measurement cavity.

A frame comprising at least four through-openings can divide the at least one receptacle of the container device into at least four measurement cavities when the frame is arranged on the container device. In this way, it can advantageously be achieved that multiple, for instance four, measurements can be performed simultaneously in the at least one receptacle of the container device. In particular, each one measurement can be performed in each one measurement cavity.

In an embodiment of the present invention, each of the at least four through-openings is of equal size.

In particular, the individual measurement cavities can be hermetically sealed. The sealing can be provided by a sealing means, e.g. in form of a layer, particularly a layer of rubber, in particular biocompatible rubber, that is arranged at a bottom of the frame. In an embodiment, the bottom of the frame comprises the contact surface of the frame. The layer can comprise silicon, organosilicon including polydimethylsiloxane (PDMS), polytetrafluoroethylene (PTFE), nitrile butadiene rubber (NBR) and/or ethylene propylene diene monomer (EPDM).

By means of a frame comprising a plurality (e.g. at least four) through-openings, a plurality of measurement cavities (e.g. at least four measurement cavities) can be generated. These measurement cavities can be independent of each other. Independent particularly means that there is no exchange of culture medium between the individual measurement cavities. The at least four independent measurement cavities provide to perform an independent measurement in each individual measurement cavity.

Furthermore, according to an embodiment of the present invention, the apparatus can comprise multiple force sensing devices, in particular multiple cantilevers, and multiple actuators, in particular multiple holding elements, particularly each one cantilever and one holding device that can be arranged in each individual measurement cavity.

According to the invention, each actuator related to each one measurement cavity can be controlled independently.

In an embodiment, each cantilever of the plurality of cantilevers (each one cantilever arranged in each one measurement cavity) can have the same bending stiffness. In another embodiment, the bending stiffness of at least one cantilever differs from the bending stiffness of another cantilever. The force exerted by each one sample on the respective cantilever can be detected independently.

An embodiment is characterised in that the frame is configured to be placed on a container device in form of a dish such that the dish forms a bottom of the at least one measurement cavity or the at least four measurement cavities when the frame is arranged on said container device.

The dish can at least form a part of the at least one measurement cavity or the at least four measurement cavities.

The dish can be a Petri dish. Advantageously, the dish comprises a transparent material at least in a region of the dish that adjoins the at least one or at least four through-openings when the frame is arranged in the dish. In other word this means that the dish and the frame are configured such that when the frame is arranged in the dish, the generated at least one measurement cavity or at least four measurement cavities comprise a transparent bottom.

The frame can have a substantially circular shape. The diameter can be between 10 mm and 200 mm, in particular between 15 mm and 150 mm.

For a measurement using the apparatus according to the present invention, only a small sample, in particular a small number of cells, and a small amount of medium and/or further reagents is needed. This reduces the costs incurred.

An advantage of the embodiment is that the apparatus is of such a dimension that it is easily embeddable in standard laboratory equipment including a Petri dish. Hence, equipment is required that is typically available in a laboratory.

In an embodiment, the frame is configured to be placed on a container device in form of a microplate. The microplate comprises a plurality of receptacles. The at least one holding element and the at least one cantilever are arranged in one receptacle of the plurality of receptacles when the frame is arranged on the container device.

In particular, the microplate can comprise 6, 12, 24, 48 or 96 receptacles, i. e. 6, 12, 24, 48 or 96 wells. Each well of a microplate can form at least a part of a measurement cavity.

The frame can be configured such that a plurality of holding elements and a plurality of cantilevers can be mounted to the frame. In particular, the frame is configured such that according to the number of receptacles (in particular 6, 12, 24, 48 or 96 receptacles) 6, 12, 24, 48 or 96 holding elements and 6, 12, 24, 48 or 96 cantilevers, respectively, can be mounted to said frame. In an embodiment the frame is configured to be arrangeable on a container device in such a way that each one cantilever and one holding element can be arranged in each receptacle of the plurality of receptacles of the container device.

In an embodiment, the apparatus can comprise a plurality of actuators.

In an embodiment, an actuator can comprise a plurality of holding elements. This means that one actuator can generate a movement of a plurality of holding elements. In case each one sample is attached to each one holding element of the plurality of holding elements, said actuator can apply a mechanical stimulus to the plurality of attached samples.

An advantage of the embodiment is that the apparatus is of such a dimension that it is easily embeddable in standard laboratory equipment including a microplate. Hence, equipment is required that is typically available in a laboratory.

By means of the apparatus, a force measurement of a sample can be performed in one well of a microplate. In particular, in each well of a microplate, an independent force measurement can be performed using the apparatus.

For a measurement using the apparatus arranged on a microplate, only a small sample, in particular a small number of cells, and a small amount of medium and/or further reagents is needed.

In certain embodiments, the apparatus comprises a plurality of cantilevers and a plurality of holding elements that extend into the plurality of receptacles or wells of the microplate, wherein each one cantilever and one holding element extend in each one receptacle or well. In other words, a respective cantilever and a respective holding element extend in each receptacle or well of the microplate.

In certain embodiments, the frame comprises a plurality of ridges running between two opposing sides of the frame, wherein each ridge comprises a plurality of mountings, wherein the mountings are configured such that a cantilever can be mounted at the ridge via a respective mounting. In particular, a respective cantilever is mounted to each mounting of the plurality of ridges.

Such ridges provide a means for attachment of cantilevers on the frame above the individual wells of a microplate, such that force measurements of samples connected to the cantilevers can be performed simultaneously in an easy manner.

In certain embodiments, the ridges run in parallel to each other.

In certain embodiments, the distance between each two neighboring mountings on a respective ridge is equal.

In certain embodiments, the actuator comprises a beam. In certain embodiments, a beam is connected to the actuator. In certain embodiments, the beam comprises a plurality of arms configured such that a respective holding element can be mounted to the beam via a respective arm. In certain embodiments, the actuator is configured to move a plurality of holding elements connected to the beam identically, wherein particularly the amplitude and the stretching and/or compression of each sample coupled to the actuator via the beam is the same when the actuator is displaced. In particular, a respective holding element is mounted to each arm of the beam.

In this manner, it is possible to significantly reduce the number of actuators necessary for applying a mechanical stimulus simultaneously to a large number of samples. Thereby, the complexity and energy consumption of the apparatus is advantageously reduced.

In certain embodiments, the apparatus comprises a plurality of actuators and a plurality of beams, wherein each beam is connected to a respective actuator, such that the plurality of holding elements connected to the respective beam can be moved identically by the respective actuator.

In certain embodiments, a respective arm and a respective mounting are arranged such that the respective arm and the respective mounting are located above a shared receptacle of the microplate.

A respective sample can then be mounted in or above the shared receptacle between the cantilever on the respective mounting and the holding element on the respective arm.

In certain embodiments, the number of arms arranged at a beam is equal to the number of mountings arranged at a ridge.

In certain embodiments, the frame comprises a frame recess, an orifice and a hole, which are in alignment with each other and arranged such that a respective actuator and a respective beam are arrangeable at the frame by means of the frame recess, the orifice and the hole.

In certain embodiments, the respective actuator is at least partially insertable into the frame recess, wherein the respective beam is arrangeable at the hole and configured to pass the orifice, such that the respective beam and the respective actuator can be connected.

In certain embodiments, the orifice and the respective beam are configured such that the respective beam can slide within the orifice.

This provides an especially tight and simple connection of the actuator and the beam on the frame. However, other means of connection are envisioned within the scope of protection, e.g. a connection by means of connection elements such as screws or by gluing.

In an embodiment, the at least one cantilever is configured to be coupled to the sample such that the at least one cantilever is deformed by a force exerted by the sample on the at least one cantilever in response to the mechanical stimulus.

The at least one cantilever can be configured in such a way that a force, in particular a force that acts perpendicular (or substantially perpendicular) to the first direction, results in a deformation of the at least one cantilever. The deformation of the cantilever occurs in a plane that is also referred to as deformation plane.

Further, according to an embodiment, the force can be generated by the sample in response of the sample to an applied stimulus. The extent the at least one cantilever is deformed is a measure of the force exerted by the sample. In particular, the larger the force exerted by the sample, the larger the deformation of the at least one cantilever. Advantageously, according to the invention the force exerted by the sample can be detected in a simple way, i.e. by detecting the deformation of the at least one cantilever.

Furthermore, according to an embodiment of the present invention, the force sensing device comprises an optical detection device for detecting the deformation of the at least one cantilever.

In particular, the optical detection device comprises an optical sensor for detecting said deformation of the at least one cantilever. Particularly, the optical detection device can be a camera or comprise a camera.

In an embodiment of the present invention, the optical detection device is located in a viewing position. In an embodiment, the viewing position is aligned perpendicular to the deformation plane. In other words this means that in this embodiment, the viewing position is aligned perpendicular to the first direction. In an alternative embodiment, the viewing position is aligned parallel to the deformation plane, in other words parallel to the first direction.

Further, in an embodiment, the optical detection device is aligned in such a way that at least the deformation of at least one cantilever can be detected by the optical detection device. This includes that at least one detection point of the at least one cantilever which is a predefined point of said cantilever can be detected by the optical detection device at least if the at least one cantilever is not deformed as well as if the at least one cantilever is maximally deformed. Advantageously, the detection point of the at least one cantilever can continuously be detected by the optical detection device. In an embodiment, the detection point of the at least one cantilever is located along the extension direction of the at least one cantilever. In another embodiment, the detection point can be located at the tip of the at least one cantilever.

Further, in an embodiment of the present invention, the optical detection device is configured and aligned in such a way that its field of view captures the sample in addition to the detection point of the at least one cantilever. This way visual, macroscopic information of the sample can advantageously be obtained in addition to the information about the deformation of the at least one cantilever. In an advantageous embodiment, both at least detection point and the sample are continuously detected by the optical detection device.

In particular, the optical detection device is configured to continuously acquire images (e.g. at least of the detection point of the at least one cantilever and/or sample), particularly at a pre-defined number of frames per second, particularly in form of a video or a high-resolution image-stack. Particularly, the optical detection device is configured to take at least 50 frames per second, particularly at least 60 frames per second, particularly at least 70 frames per second, particularly at least 80 frames per second, particularly at least 90 frames per second, particularly at least 100 frames per second.

Further, according to an embodiment, the optical detection device comprises at least one objective which may comprise a suitable magnification. In particular, the optical detection device may comprise a magnification in the range from 10× to 100×.

Further, in an embodiment, the optical detection device comprises a microscope. In particular, the microscope can be an (e.g. conventional) light microscope. Further, the microscope can be configured to enable polarized light imaging or fluorescence imaging.

In case a frame that is configured to provide measurements in a plurality of measurement cavities (e.g. a frame comprising at least four through-openings which is positioned in a dish or a frame that is arranged on a microplate) is used, an optical detection device can be used that is configured to monitor at least the deformation of the plurality of cantilevers related to the plurality of measurement cavities.

Further, such an optical detection device can advantageously be positioned in such a way, that at least the individual force sensing devices related to the at least four measurement cavities or the plurality of measurement cavities can be observed simultaneously. This means that only one optical detection device has to be present to detect the deformation of each one cantilever in the at least four or the plurality of measurements cavities. This reduces the cost and is an advantage compared to prior art using standard force transducers wherein each one sample is coupled to each one force transducer to detect the exerted force.

Certainly, each of the at least four measurement cavities or the plurality of measurement cavities can alternatively be monitored by each one optical detection device.

Furthermore, according to an embodiment of the present invention, the apparatus comprises an analyzing device for processing and/or storing data provided by the force sensing device to determine the force exerted by the sample on the at least one cantilever.

Particularly, the analyzing device is configured to receive data, particularly data provided by the force sensing device. Further, particularly, the analyzing device is configured to store and/or to process said data. Particularly, the analyzing device is configured to determine the force exerted by the sample by conducting an analysis of the deformation of the at least one cantilever.

Further, the analyzing device can be configured to output the (e.g. raw) data and/or the processed data.

According to a further embodiment of the present invention, the at least one cantilever forms an electrode for the application of an electrical stimulus to the sample.

In other terms, this means that the at least one cantilever being part of the force sensing device is also configured to apply an electrical stimulus to the sample. Hence, the at least one cantilever is able to generate at least two tasks. In this way an electrical stimulus can be applied to the sample by means of the electrode (i. e. the at least one cantilever) without increasing the number of devices that have to be in contact with the sample. Hence, the functional extent of the apparatus is increased without increasing the complexity of the apparatus, i.e. without increasing the number of devices that have to be in contact with the sample.

Particularly, according to an embodiment, the at least one cantilever comprises or consists of an electrically conductive material. In an embodiment, the actuator, in particular the at least one holding element, also comprises an electrically conductive material.

In an embodiment, at least a part of the at least one cantilever can be insulated. In another embodiment, at least a part of the at least one holding element can be insulated. According to the invention, both at least a part of the at least one cantilever and at least a part of the at least one holding element can be insulated.

An at least partial insulation can comprise a biocompatible material. In particular it can be provided by a polymeric insulation. The insulation can comprise or consist of at least one of the following materials: polyethylene, polydimethylsiloxane, and silicone elastomers.

Further, in an embodiment, for the application of an electrical stimulus, the electrode is connected to a generator that is configured to generate a voltage between 0.1 V and 30 V. Particularly, the generator is configured to generate voltage pulses, in particular with a frequency of 1 Hz to 10 Hz.

The electrodes can be connected to the generator by a printed circuit board embedded within the lid of the bioreactor. In the multiwell version, the circuit can activate an electrode positioned in a single well or a plurality of electrodes positioned in a plurality of wells by a combination of switches and interrupters.

Further, according to an embodiment of the present invention, the at least one cantilever comprises a material that is pseudoelastic.

Particularly, the at least one cantilever can comprise or consist of a pseudoelastic material, including a pseudoelastic material having shape memory properties. Pseudoelasticity is also known as superelasticity.

Particularly, a pseudoelastic material is characterized in that it can be deformed by an applied stress and recovers to its original unstressed shape when the stress is removed.

The advantage of a pseudoelastic material is that within a broad range, the deformation occurs in the linear range including a case of a small deformation. Thus, there is no concern of the occurrence of a non-linearity in the case of a small deformation. Moreover, there is no risk of residual deformation when the stress is removed. This simplifies the analysis and the determination of the force exerted by the sample based on the deformation of the at least one cantilever, obtaining more accurate and reliable measurements.

In certain embodiments, the pseudoelastic material is a nickel titanium alloy, more particularly a nickel titanium alloy with an approximately equivalent atomic percentage.

In certain embodiments, the at least one cantilever comprises a material different from the material the at least one holding element comprises, wherein particularly the material of the at least one cantilever is pseudoelastic and the material of the at least one holding element is not pseudoelastic.

For instance, the material of the at least one holding element may be more rigid than the material of the at least one cantilever. The inventors surprisingly found that the combination of a pseudoelastic cantilever with a more rigid holding element results in especially good attachment of the sample on the cantilever and the holding element while retaining the ability to perform an accurate measurement of stretching and compression force of the sample.

In certain embodiments, the at least one holding element comprises a bending stiffness which is greater than a bending stiffness of the at least one cantilever, wherein particularly the at least one holding element is formed from stainless steel.

Moreover, by means of the material small forces, in particular forces smaller than 10 mN, in particular in the range of 1 mN, more particularly in the range of 0.1 mN, can be determined. Amongst others, the range that can be detected by the at least one cantilever is determined by its length, its cross section area and the binding stiffness of the at least one cantilever, wherein the binding stiffness depends on the elastic modulus of the material comprised by the at least one cantilever. The range that can be detected by the at least one cantilever is also referred to as the measuring range or the sensitive region.

Further, according to an embodiment, the invention comprises a cantilever with an average diameter between 0.2 mm and 1.5 mm, particularly between 0.25 mm and 1.5 mm, and/or a length along the longitudinal axis between 5 mm and 80 mm, and/or an elastic modulus between 20 MPa and 100 MPa. A bending stiffness of the at least one cantilever between 1.13 mN/mm and 1.47 N/mm can be provided. The greater the bending stiffness, the stiffer the respective cantilever. A cantilever with a small bending stiffness is also referred to as a soft cantilever.

Furthermore, according to an embodiment, the invention comprises a cantilever with a length of 50 mm and a cross-section of circular shape with an average diameter between 0.406 mm and 1.016 mm. Further, particularly, the pseudoelastic material can comprise an elastic modulus between 20 MPa and 100 MPa, particularly between 50 MPa and 80 MPa, resulting in bending stiffness of the cantilever between 7.4 mN/mm and 0.29 N/mm.

By a replacement of the (first) cantilever by another (second) cantilever with an elastic modulus different from that of the first cantilever, the measuring range can easily been changed. This means that the measuring range is easily adjustable. This is also referred to as tunable sensibility of the force sensing device. Forces between e.g. 0.1 mN and 10 N, particularly between e.g. 1 mN and 10 N, can be measured by simply exchanging the at least one cantilever.

Thus, the invention is not limited to a measurement of small forces. The invention can be used for wide range of applications.

Advantageously, for changing the measuring range only the force sensing device, in particular only the at least one cantilever has to be exchanged while all other devices of the apparatus remain unchanged. Hence, a quick adjustment of the measuring range can be achieved.

In particular, according to an embodiment of the present invention, the at least one cantilever comprises a pseudoelastic metal.

For instance, a nickel titanium based alloy can be used as a pseudoelastic material. It can include additional elements but the alloy can also be a binary alloy consisting essentially of nickel and titanium. In particular, a nickel titanium alloy with approximately equivalent atomic percentage is considered, for example, a nickel and titanium alloy that is also known as nitinol.

In the case the at least one cantilever comprises a pseudoelastic metal, the at least one cantilever can be advantageously used to fulfill two tasks: to fulfill its force sensing task and to form an electrode (see also above).

Further, according to an embodiment of the present invention, the actuator is a hydraulic actuator.

Particularly, this means that the mechanical stimulus can be controlled by using a hydraulic actuator.

Further, in an embodiment of the present invention, the hydraulic actuator is driven by a syringe pump. Particularly, this means that the displacement, in other terms the movement, along the second direction can be controlled by the syringe pump.

According to a further embodiment of the present invention, the actuator comprises a first unit comprising a first cylinder and a first piston, which first unit is coupled to a second unit comprising a second cylinder and a second piston, wherein the first piston can be coupled to the sample. In particular, the first piston is linked to or forms the holding element, wherein the second unit is coupled to the syringe pump. The second piston is also referred to as driving piston.

A displacement of the driving piston results in the corresponding displacement of the first piston that can mediate the mechanical stimulus to the sample coupled to the actuator (and the force sensing device), i.e. the stretching and/or the compression of the sample.

Particularly, the hydraulic actuator is configured to generate a movement back and forth along the second direction. Particularly, this means that the moving direction of the pistons can change its orientation. Hence, a stretching and/or a compression of the sample that is coupled to the actuator and the force sensing device can be generated. The difference between the two turning points of the movement, i.e. the difference between the extreme values of the piston movement is also referred to as amplitude in the following.

Advantageously, the orientation of the moving direction can continuously be changed. In an advantageous embodiment, the driving piston performs a cyclic translation. Particularly, the cyclic translation can comprise a sinewave form. In case that the hydraulic actuator is controlled by a syringe pump, the cyclic translation can be controlled by the syringe pump.

According to an embodiment of the present invention, the amplitude can lie in the range between 0 mm and 15 mm, in particular between 1 µm and 2 mm. The frequency with which the orientation of the moving direction is changed can lie in the range between 0 Hz and 20 Hz.

Furthermore, according to an embodiment of the present invention, the apparatus is configured to generate a movement of the piston with a frequency between 0 Hz and 10 Hz and/or with an amplitude between 0 mm and 2 mm.

Further, particularly, by means of the syringe pump, a controlled mechanical stimulus, i.e. a stretching/compression of the sample with a specific amplitude and frequency, is provided. Advantageously, the syringe pump can generate a small motion, i.e. a precise actuation, in a small volume.

Furthermore, for a precise measure of the force exerted by the sample, it helps to prevent inadvertent external influences, e.g. vibrations. Otherwise, e.g. vibrations might affect the deformation of the at least one cantilever and in consequence the determination of the force exerted by the sample.

Further, according to an embodiment, the hydraulic actuator is configured in such a way, that it causes as little as possible vibrations. Particularly, the apparatus may comprise a hydraulic connection which is a vibration damper. Particularly, this can be used to cut vibrations e.g. originating from electric motors.

Further, according to an embodiment, the apparatus may comprise a standard, commercially available syringe pump. In an alternative embodiment, the invention may comprise a custom-made syringe pump.

An embodiment of the bioreactor device is characterized in that the actuator is configured to be coupled to a plurality of samples and to apply a mechanical stimulus to the plurality of samples.

The actuator can apply an identical mechanical stimulus to the plurality of samples coupled to said actuator. In the context of this application, an identical mechanical stimulus particularly means that the actuator is displaced such that the amplitude and the frequency of the stretching and/or compression of each one sample coupled to that actuator is the same.

In an embodiment, the apparatus can comprise a plurality of actuators wherein each one actuator of the plurality of actuators can be configured to be coupled to a plurality of samples.

According to a further embodiment, the apparatus comprises at least one control device configured to control the actuator.

Particularly, the at least one control device is configured to control the actuator and in consequence to control the mechanical stimulus. In particular, the at least one control device is configured to control the amplitude and the frequency of the displacement/movement generated by the actuator.

In an advantageous embodiment, the algorithm that controls the actuator is translated from standard G-code. G-code is a common programming language by means of which a machine can be programmed how to perform a movement. A G-code algorithm can easily be adjusted to meet individual requirements of a user. This renders the at least one control device versatile. In an embodiment, a G-code algorithm is used for the generation of a sinewave form by means of Bresenham's discretization algorithm that determines the displacement of the at least one holding element and hence determines the mechanical stimulus that can be applied to a sample.

Further, in an embodiment, the at least one control device is configured to track the displacement of the driving piston and the displacement of the first piston. In particular, the at least one control device is moreover configured to compare the displacement of the driving piston and the first piston. In that way it can be controlled whether a movement of the driving piston is appropriately transferred to a movement of the first piston and hence also corresponds to the applied mechanical stimulus. Hence, this means that in this particular embodiment the at least one control device can serve as a feedback control mechanism.

Further, according to an embodiment of the present invention, the apparatus comprises at least one sensor arranged in or above the at least one receptacle or arranged in or above the at least one measurement cavity.

In particular, the at least one sensor is configured to measure at least one of: the temperature, pH, oxygen ($O_2$) concentration, nitrogen ($N_2$) concentration and/or carbon dioxide ($CO_2$) concentration of a milieu surrounding the sample. The apparatus may comprise a plurality of sensors, wherein each of these sensors can be configured to measure one of the afore-mentioned quantities.

Particularly, in the at least one receptacle or the at least one measurement cavity, there is a specific milieu, also referred to as culture milieu. This milieu may be defined by a specific temperature and/or a specific pH and/or a specific concentration and/or a composition of substrates, in particular a specific culture medium also referred to as medium.

The at least one sensor can be configured to measure a concentration or a quantity derived therefrom or relating thereto.

By means of at least one sensor, in particular culture milieu parameters can be monitored. Particularly, the at least one sensor is configured to measure (e.g. over time) at least one of: the temperature, pH, oxygen ($O_2$) concentration, nitrogen ($N_2$) concentration carbon dioxide ($CO_2$) concentration. In particular, the at least one sensor is configured to enable a real-time monitoring of the respective culture milieu parameter.

The invention can comprise more than one sensor, wherein particularly each sensor measures one of the culture milieu parameters stated above.

In particular, the at least one sensor comprises an optical probe.

Further, according to an embodiment of the present invention, the apparatus comprises a first monitoring device that is configured for processing and/or storage of data provided by the at least one sensor.

Particularly, the first monitoring device can be configured to store data provided by the at least one sensor, in particular real-time monitoring data. Moreover, the first monitoring device may be configured to process the data, particularly to analyze the data, including a comparison of data provided by at least two sensors.

Further, in an embodiment of the present invention, the first monitoring device is configured to process the data in such a way that the data provided by the at least one sensor can be related to data provided by the analyzing device.

Further, in an embodiment, the first monitoring device comprises a camera which is configured and aligned in such a way that it can monitor the at least one sensor, in particular the at least one sensor that comprises an optical probe.

Further, in an embodiment, the first monitoring device is connected to the analyzing device or comprises the analyzing device providing a fast and easy combination of data obtained by the first monitoring device and the analyzing device and subsequently a user-friendly analysis of the data.

The invention can also comprise an outputting of data and/or processed data. Particularly, the apparatus can be configured to output said data and/or processed data, e.g. for further analysis and/or documentation.

The apparatus can be configured in such a way that a lid could be put on the apparatus, in particular such that the container device is closed by the lid. This might be the original lid, e.g. the lid of a Petri dish, or a custom-made lid. A custom-made lid can be configured to allow for a customer-specific access through the lid at least to the at least one receptacle (or measurement cavity) or the plurality of receptacles (or measurement cavities). In an embodiment of the invention, the lid and/or the custom-made lid comprises a transparent material, advantageously a transparent, sterilizable material.

The advantage of a lid is that the apparatus can be used under sterile conditions. This expands the range of applications of the present invention.

If the lid comprises a transparent material, the optical access to the at least one measurement cavity (or receptacle) or the plurality of measurement cavities (or receptacles), in particular to the respective cantilever and/or the sample, is advantageously preserved.

Further, according to an embodiment of the invention, the apparatus is configured to be arranged on a stage of a microscope.

Particularly, in an embodiment, the apparatus is configured to be arranged on a stage of a light microscope, a fluorescence microscope, a confocal microscope, a polarized light microscope and/or an atomic force microscope.

This embodiment advantageously enables the detection of microscopic properties of the sample together with the detection of macroscopic properties of the sample determined by the at least one sensor and/or the force sensing device. In particular, the common detection of microscopic and macroscopic properties of the sample in real time is enabled.

The microscope can also be coupled to the optical detection device and be used to detect the deformation of the at least one cantilever. The microscope can also be coupled to a monitoring device that is configured to process and/or store the data provided by the microscope.

Another aspect of the invention is related to a system comprising an apparatus according to the invention and a container device, wherein the container device is a dish or a microplate.

In an embodiment, the container device is a Petri dish. In an alternative embodiment, the container device is a microplate, in particular a microplate comprising 6, 12, 24, 48 or 96 wells. Hence, the container device can be standard laboratory equipment.

Yet another aspect of the present invention is related to a microscope comprising an apparatus according to the present invention or a system comprising an apparatus according to the present invention and a container device.

The apparatus can be integrated into the microscope or it can be configured to by releasably connected to the microscope.

In particular, the microscope can be one of: a light microscope, a fluorescence microscope, a confocal microscope, a polarized light microscope or an atomic force microscope.

Particularly, the microscope can be configured to obtain microscopic information of the sample and/or to detect the deformation of the at least one cantilever.

A further aspect of the invention is directed towards a method for determining properties of a sample using an apparatus according to the invention, a system according to the invention or a microscope comprising an apparatus or a system according to the invention. The method comprises the steps of:

coupling a sample to the at least one holding element and to the at least one cantilever, and arranging the frame on a container device.

In one embodiment of the method, the deformation of the at least one cantilever is detected, in particular by an optical detection device.

In another embodiment of the method, the force exerted by the sample is determined based on the deformation of the at least one cantilever.

Figure 2:
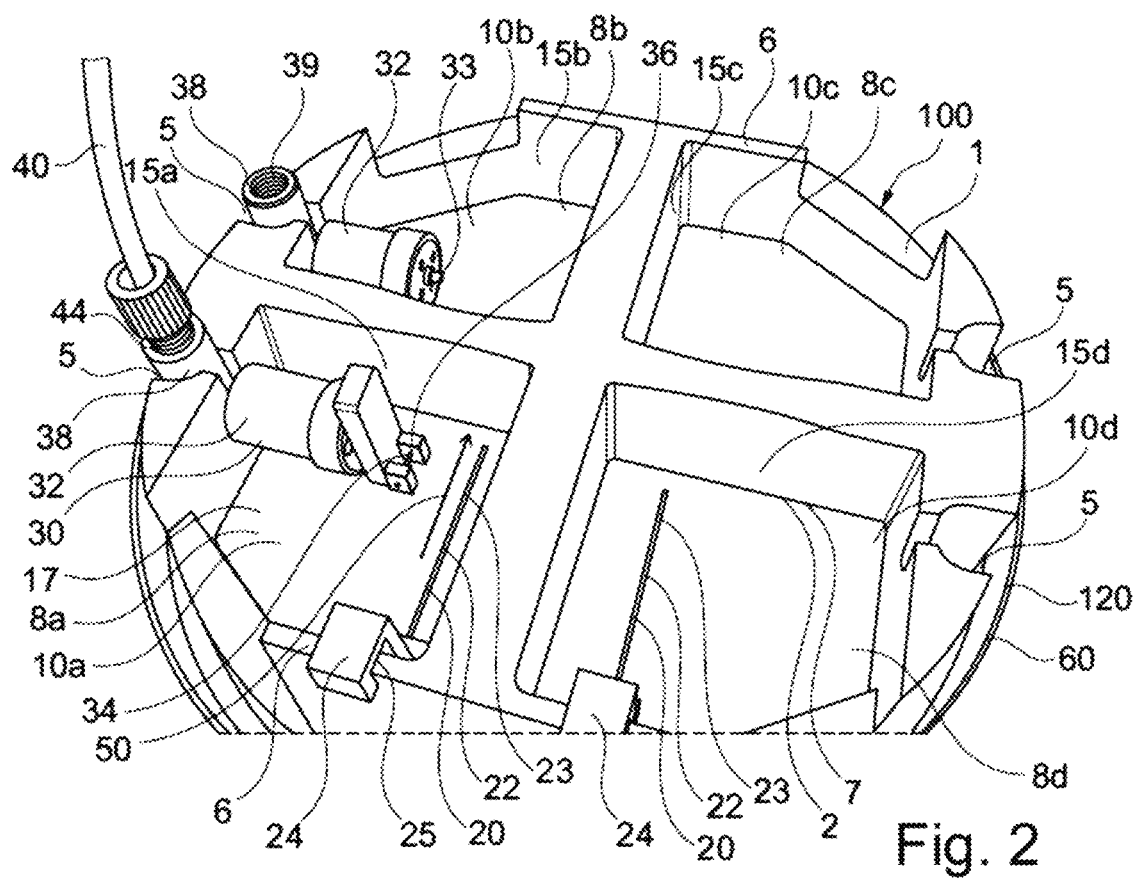
Figure 3:
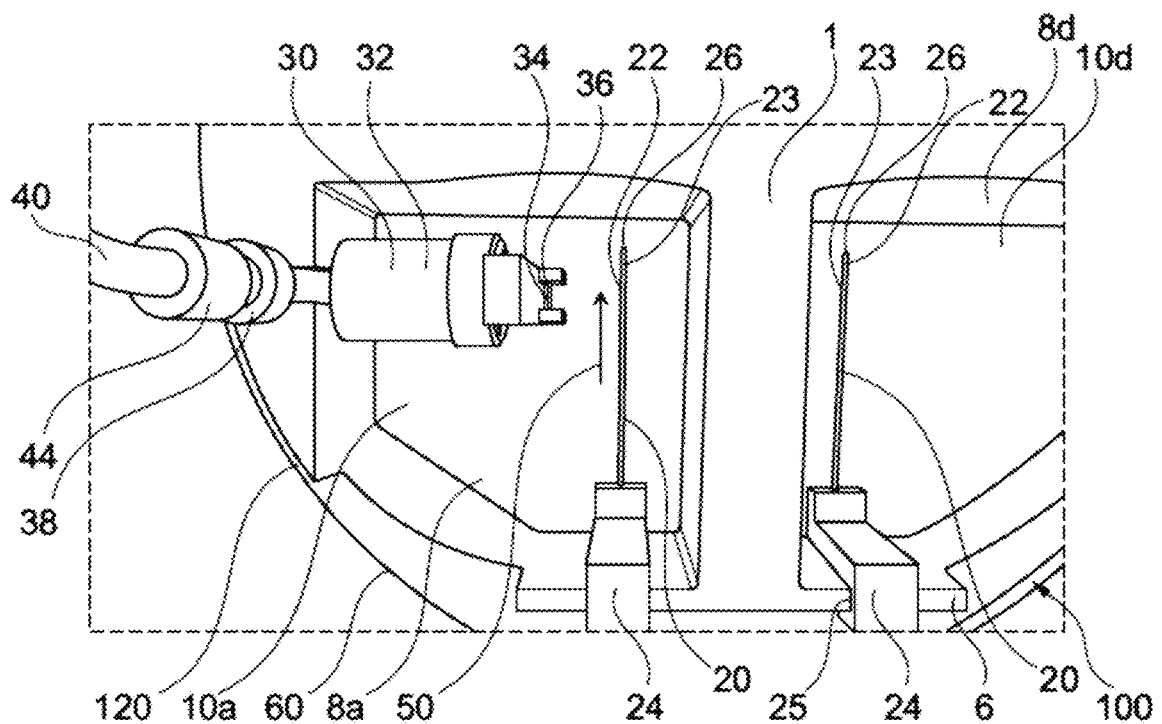
Figure 4:
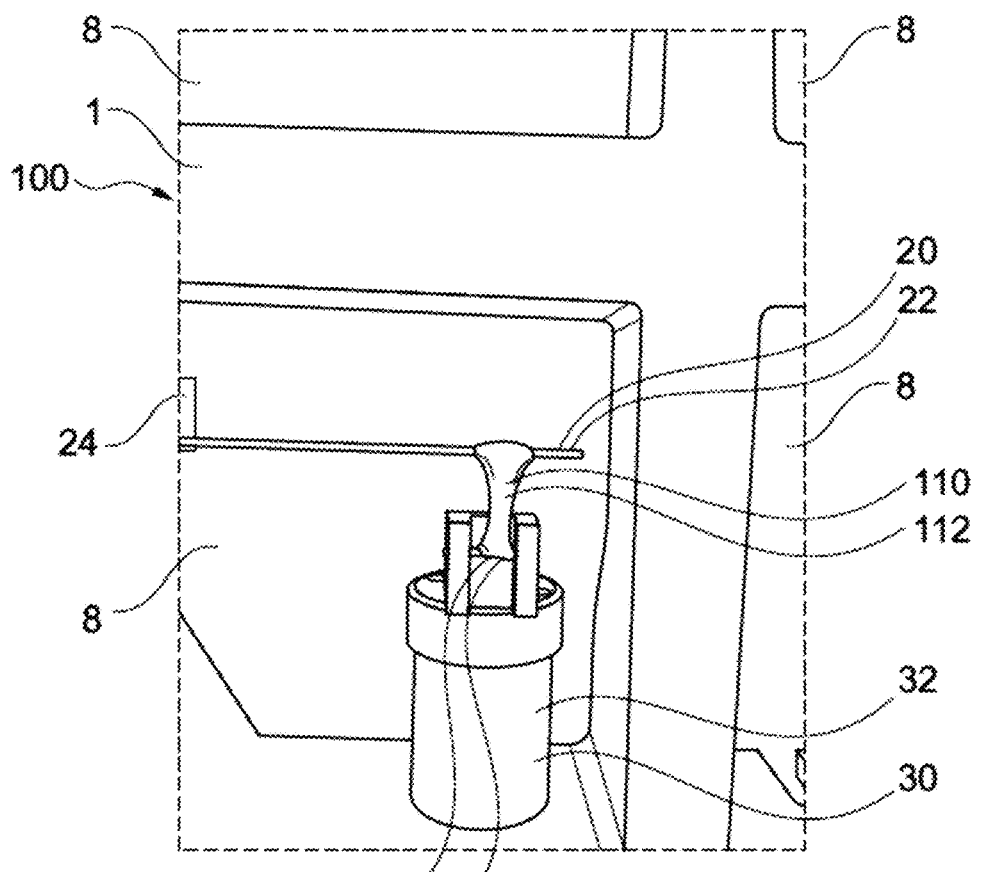
Figure 5:
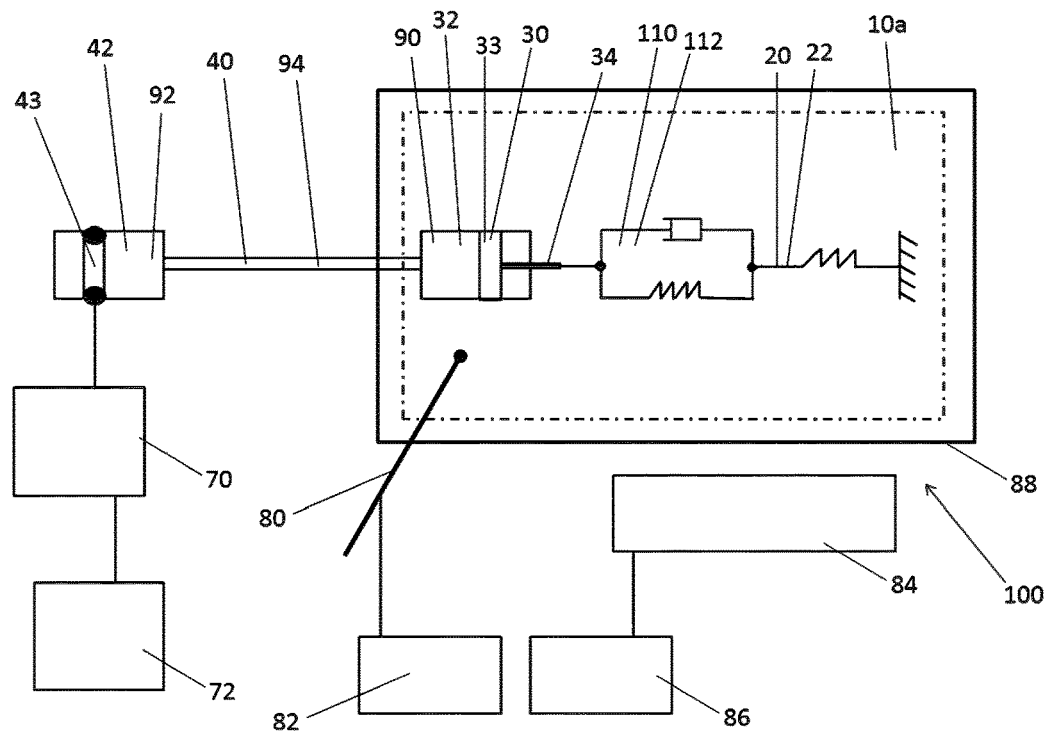
Figure 6:
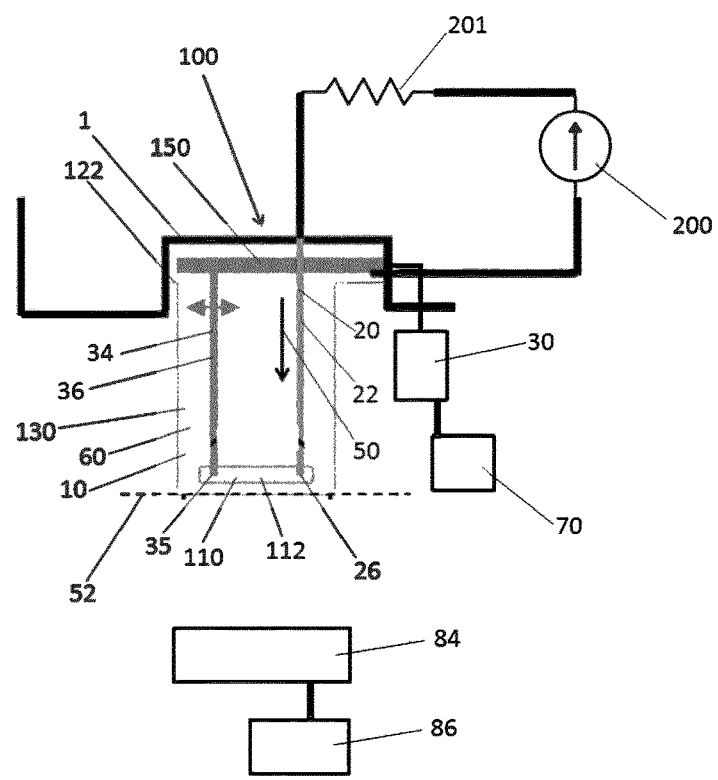
Figure 7:
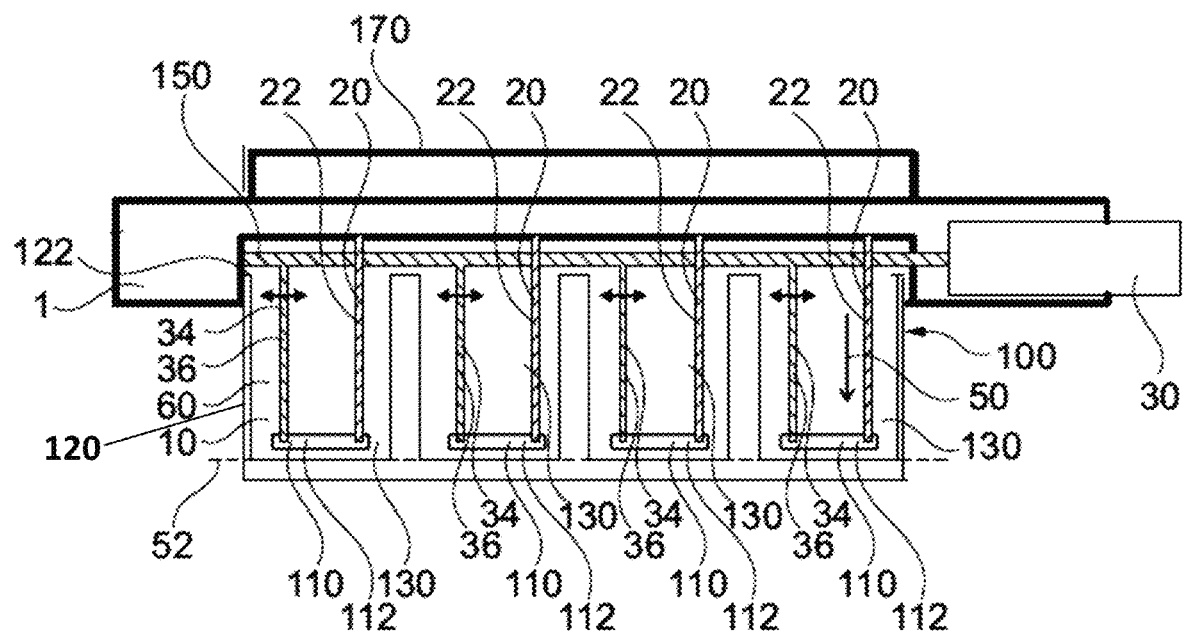
Figure 8:
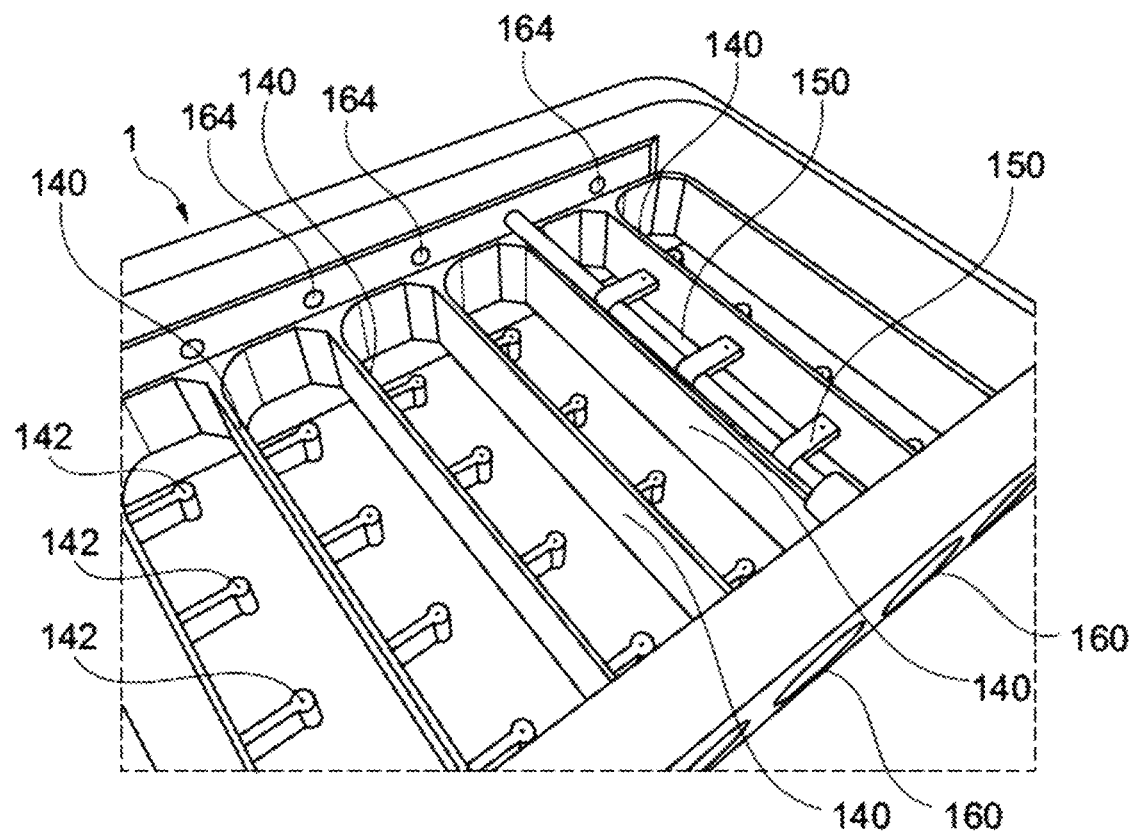
Figure 9:
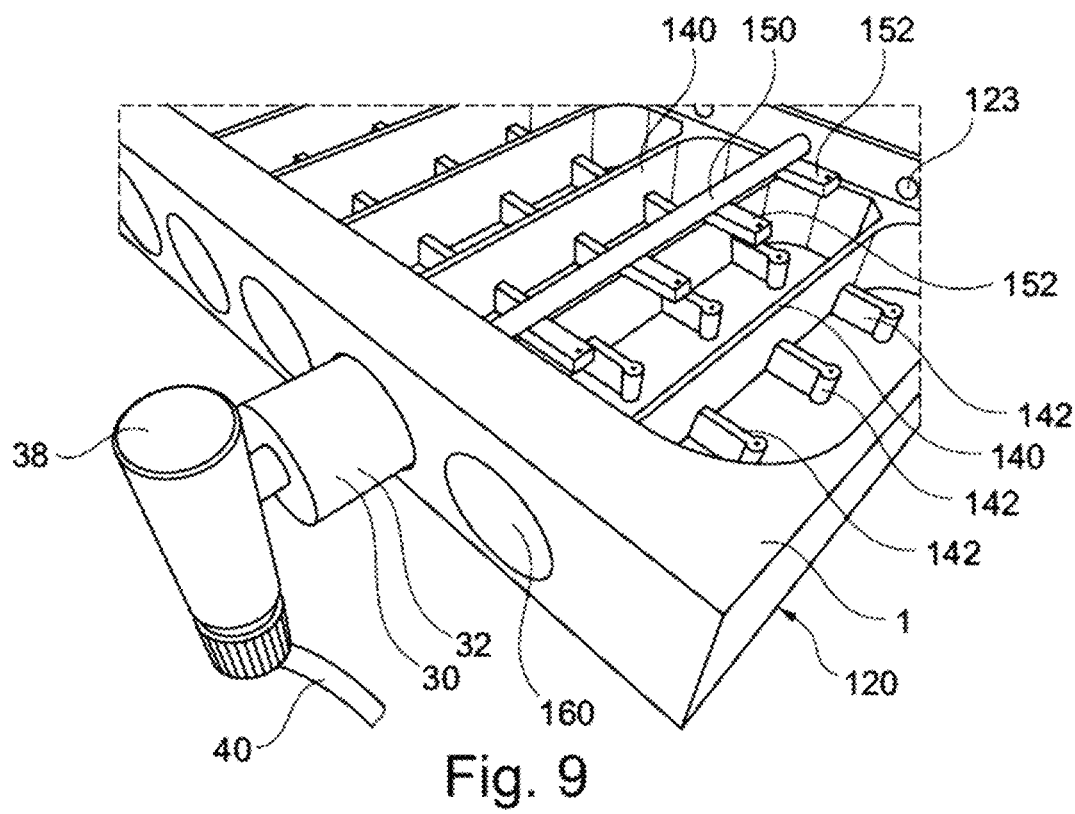
Figure 10:
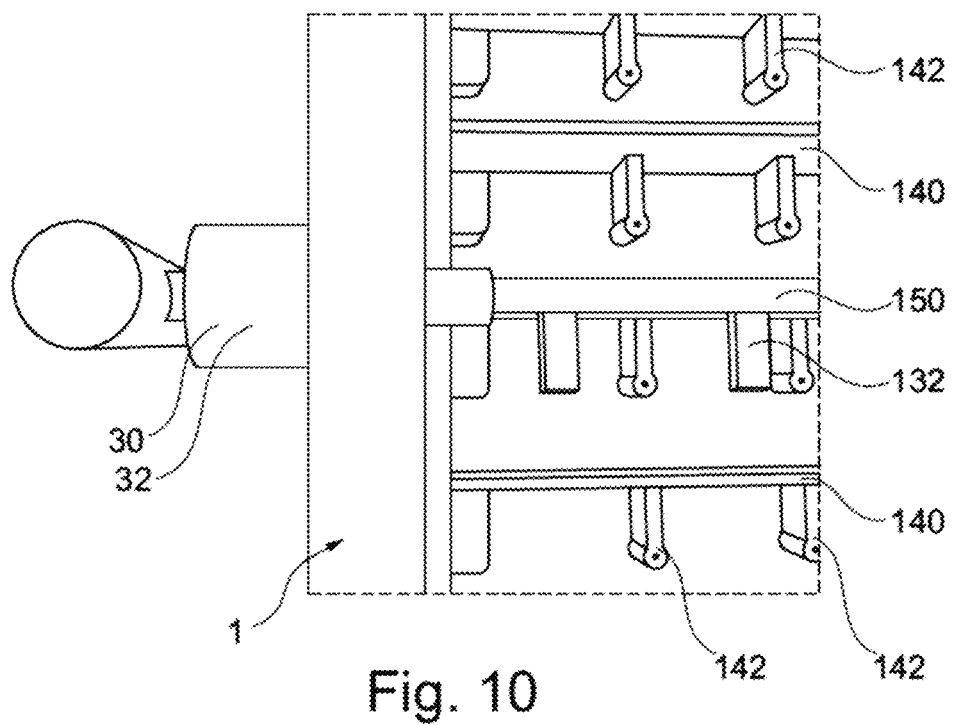
Figure 11:
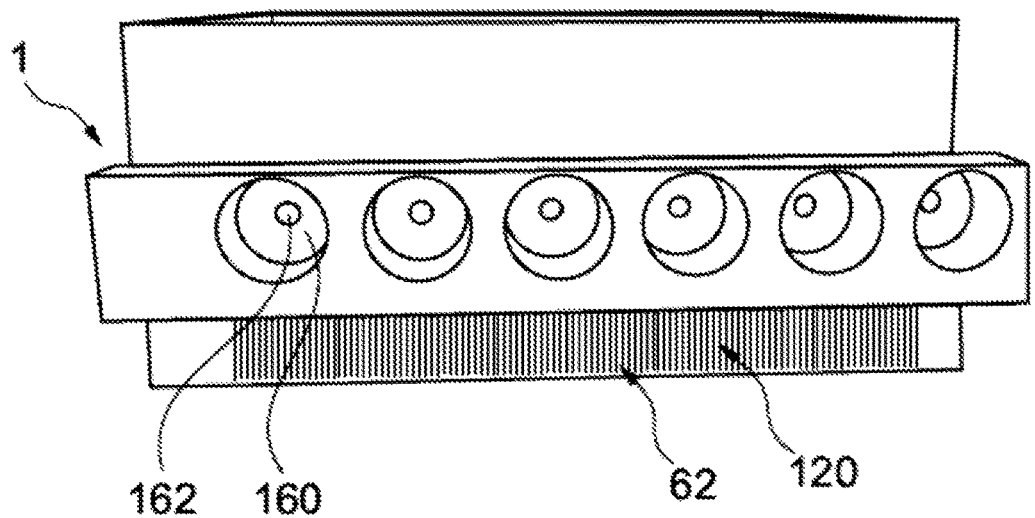
Figure 12:
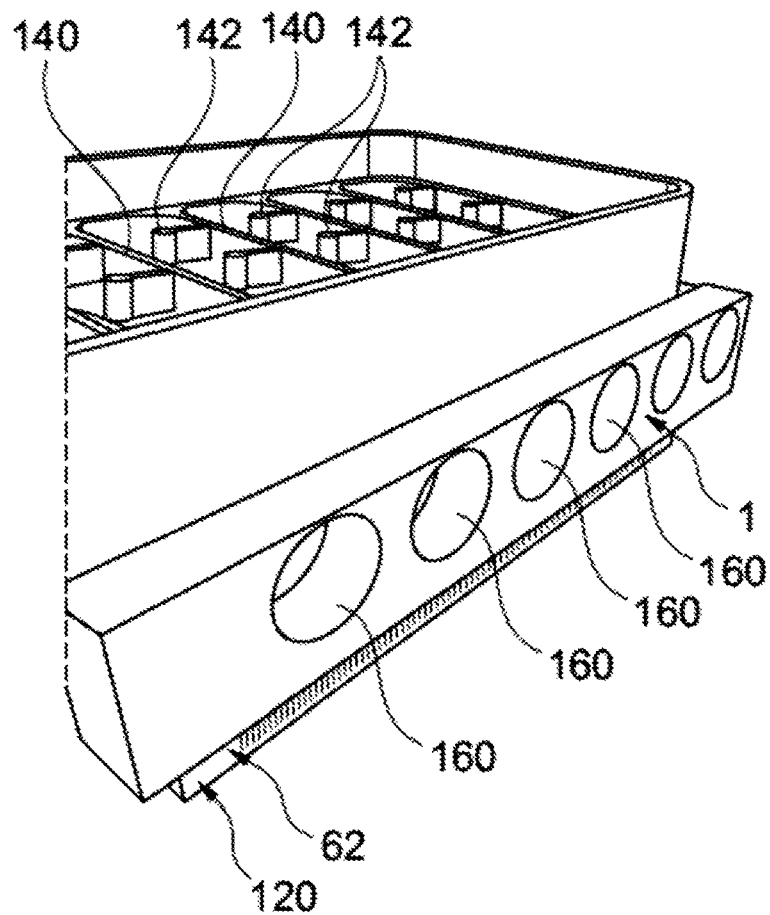
Figure 13:
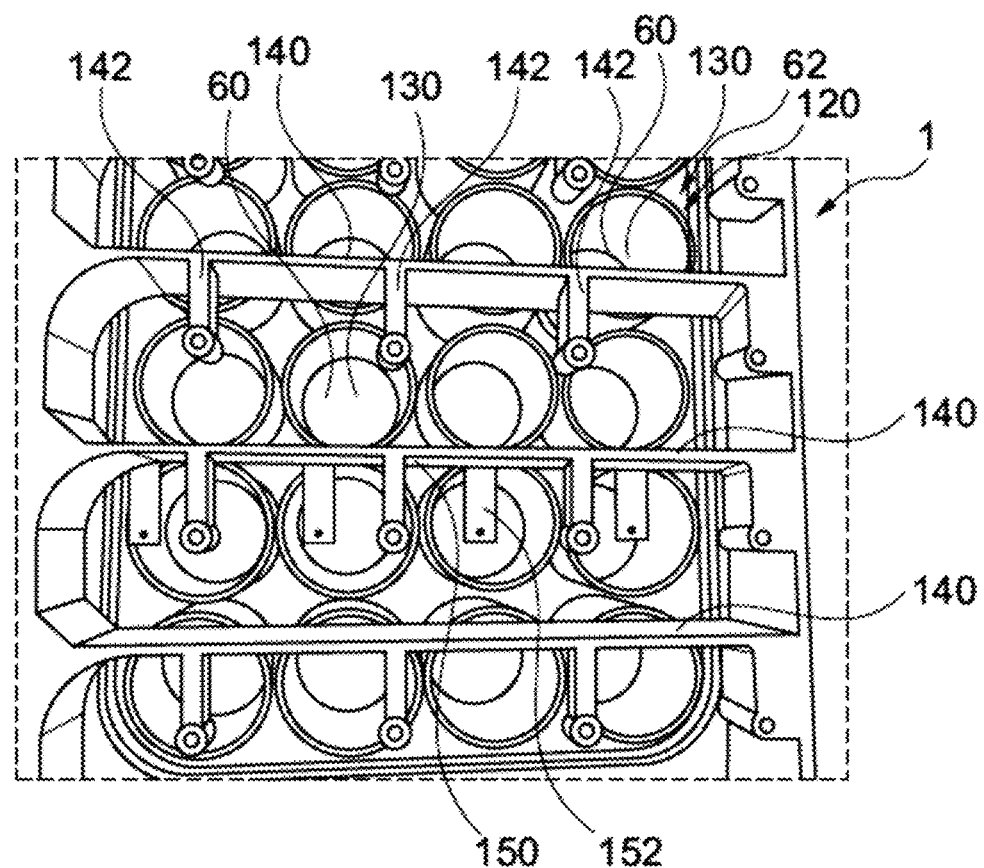
Figure 14:
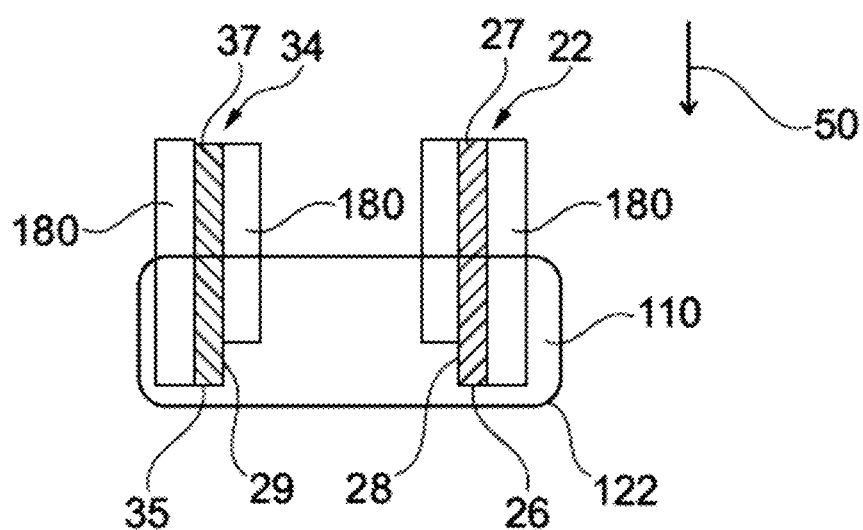

In the following, further features, advantages and embodiments of the present invention are explained with reference to the Figures, wherein FIG. 1 shows a schematic top view of an embodiment of an apparatus according to the present invention, FIG. 2 shows an apparatus comprising a cantilever in horizontal orientation according to the present invention that is positioned in a dish, FIG. 3 shows an enlarged top view of the apparatus shown in FIG. 2, FIG. 4 shows a top view of one measurement cavity with an actuator and a force sensing device, wherein both are coupled to a sample, FIG. 5 shows a schematic diagram of an embodiment of an apparatus according to the present invention, FIG. 6 shows a schematic side view of an embodiment of an apparatus comprising a cantilever in vertical orientation, FIG. 7 shows a schematic side view of an embodiment of an apparatus positioned on a multiplate, FIG. 8 shows a perspective view of a part of a frame, FIG. 9 shows a perspective view of a part of a frame and an actuator arranged at the frame, FIG. 10 shows a top view of a part of a frame and an actuator arranged at the frame, FIG. 11 shows a side view of a frame arranged on a multiplate, FIG. 12 shows a perspective side view of a frame arranged on a multiplate, FIG. 13 shows a top view of a frame arranged on a multiplate, and FIG. 14 shows a schematic illustration of the attachment of a sample to an insulated cantilever and an insulated holding element.

FIG. 1 shows a schematic representation of an embodiment of an apparatus 100 according to the present invention. In FIGS. 2-4 different views of an apparatus 100 are given.

A frame 1 comprises a plurality of through-openings 8a, 8b, 8c, 8d, here e.g. four through-openings 8a, 8b, 8c, 8d. In the present embodiment, the outer boundary 3 of the frame 1 is of circular shape or substantially of circular shape such that the frame 1 can be arranged in a container device 120, in particular in a container device 120 in form of a dish 60, in particular in form of a Petri dish (FIGS. 2, 3).

In the case the frame 1 comprising four through-openings 8a, 8b, 8c, 8d is arranged in the dish 60, the receptacle 130 of the container device 120 is subdivided into four measurement cavities 10a, 10b, 10c, 10d.

Each through-opening 8a, 8b, 8c, 8d can be restricted by a wall 9a, 9b, 9c, 9d which can form the lateral wall 15a, 15b, 15c, 15d of the respective measurement cavity 10a, 10b, 10c, 10d. Each through-opening 8a, 8b, 8c, 8d can have the same size. Furthermore, each through-opening 8a, 8b, 8c, 8d can have the same shape, e.g. the shape of a pentagon with rounded corners.

FIG. 2 shows a frame 1 that comprises four through-openings 8a, 8b, 8c, 8d which is positioned in a dish 60 in such a way that the dish 60 forms the bottom of each of the four measurement cavities 10a, 10b, 10c, 10d. The bottom of each of the four measurement cavities 10a, 10b, 10c, 10d can extend in a first plane 52. FIG. 3 shows an enlarged top view of the apparatus 100 shown in FIG. 2.

In or at a first through-opening 8a, a force sensing device 20 and an actuator 30 can be positioned.

The force sensing device 20 can comprise a cantilever 22 and an attachment device 24. Via the attachment device 24, the force sensing device 20 can be attached to the frame 1. Particularly, the cantilever 22 can be fastened to the attachment device 24. The cantilever 22 comprises a tip 26 of the cantilever 22 that can be located opposite to the end of the cantilever 22 that is fixed. The longitudinal axis of the cantilever 22 can extend along the first direction 50. Furthermore, the cantilever 22 can form an electrode 23.

Furthermore, the actuator 30 can comprise a first cylinder 32, a first piston 33 (forming a first cylinder-piston unit 32, 33) and a holding element 34 which can comprise a rod 36. The holding element 34 can be configured such that the rod 36 is fixed at two points. In an embodiment, the holding element 34 can be connected to the first piston 33. The longitudinal axis of the holding element 34 may run in parallel with the longitudinal axis of the cantilever 22. The holding element 24 and the cantilever 22 can be distanced from each other.

The first cylinder 32 can be connected to a hydraulic connection piece 38. Such a hydraulic connection piece 38 can serve as a connector to connect the first cylinder-piston unit 32, 33 with a syringe pump.

The frame 1 can comprise four recesses 5. Each of the four recesses 5 can be located close to each of the four through-openings 8a, 8b, 8c, 8d. The hydraulic connection piece 38 can be positioned in the recess 5 close to the respective through-opening 8a, 8b, 8c, 8d.

The shown apparatus 100 can be configured to provide an electrical and/or a mechanical stimulation of a sample 110 (cf. FIG. 4). Certainly, the apparatus 100 can also be configured to allow for a chemical stimulation of the sample. The sample 110 can exemplarily be chemically stimulated by applying a drug and/or changing the composition of the culture milieu.

The frame 1 can comprise a contact surface 2, which can be the bottom of the frame 1 or in other words the side of the frame 1 that may be located on the dish 60. It can comprise a sealing means (e.g. in form of a layer) 7, particularly layer 7 of rubber, in particular a layer 7 of a biocompatible rubber. Such a sealing means may serve for hermetically sealing the individual measurement cavities 10a, 10b, 10c, 10d.

Particularly, a force sensing device 20 and an actuator 30 can be positioned in or at the first through-opening 8a/measurement cavity 10a. As described above, the force sensing device 20 comprises a cantilever 22 and an attachment device 24. The frame 1 and the attachment device 24 can each have a region of complementary design. This e.g. means that the frame 1 can comprise a protuberance or protrusion 6 and the attachment device 24 may comprise a slot 25 that is of complementary shape of the protuberance or protrusion 6 of the frame 1. By fitting the slot 25 into the protuberance/protrusion 6 an easy fixation of the attachment device 24 to the frame 1 can be established.

The cantilever 22 can extend into the first direction 50. In an embodiment, the first direction 50 runs parallel to the first plane 52. This arrangement can also be referred to as horizontal orientation. The cross section of the cantilever 22 can be of circular shape. In particular, the cantilever 22 comprises a pseudoelatic material, in particular a nickel titanium based alloy, e.g. nitinol.

Particularly, the first cylinder 32 is connected to a hydraulic connection piece 38 which is positioned in a recess 5 close to the first receptacle 10. Such a hydraulic connection piece 38 can comprise an internal thread 39 via which it can be connected to a second connection piece 44. The second connection piece 44 can be connected to a tube 40 which can be connected to a second cylinder 42, as schematically illustrated in FIG. 5, enabling a connection of the actuator 30 with a syringe pump 70.

Advantageously, the apparatus 100 of the present invention can be set up in a variable fashion. Particularly, in the embodiment shown in FIG. 2, the first cylinder 32 and the first piston 33 are positioned in the second measurement cavity 10b but no force sensing device 20. In contrast, a force sensing device 20 is positioned in the fourth measurement cavity 10d but not a first cylinder 33 nor an actuator 30. Neither a first cylinder 33 nor a force sensing device 20 is positioned in the third measurement cavity 10c. However, each of the four through-openings 8a, 8b, 8c, 8d is designed in such a way that an actuator 30 and a force sensing devices 20 can be located in each through-opening 8a, 8b, 8c, 8d and hence in each measurement cavity 10a, 10b, 10c, 10d restricted by the respective through-opening 8a, 8b, 8c, 8d. In such a case, independent experiments can be performed in parallel in the individual measurement cavities 10a, 10b, 10c, 10d in one receptacle 130 of a container device 120, e.g. in one Petri dish 60. Hence, measurements, in particular force measurements can be performed in a small volume and hence, only small amount of cells and/or medium are needed to perform those experiments/measurements.

FIG. 4 shows an enlarged top view of an apparatus 100, wherein an actuator 30 and a force sensing device 20 are positioned in the first through-opening 8a and wherein the cantilever 22 and the holding element 34 are coupled to a sample 110.

The sample 110 can comprise a hydrogel 112. This enables to hold the sample 110, in particular an engineered tissue, both at the side of the actuator 30 (in particular the holding element 34) and at the side of the cantilever 22. In an alternative embodiment, custom grasps, e.g. soft clamps, can be used to hold the sample 110 at least at one of both sides.

In FIG. 5 a schematic diagram of an embodiment of an apparatus 100 is shown, comprising a first measurement cavity 10a, which is positioned on the stage of a microscope 88. A sample 110 can be positioned between the actuator 30 and the force sensing device 20, in particular between the holding element 34 and the cantilever 22. At least one sensor 80 can be arranged in or above the measurement cavity 10a and can be connected with a control unit 82 configured to receive, process and/or store the data provided by the sensor 80. This can include measurements of the temperature, the pH, $O_2$ and/or $CO_2$ concentration, in particular time-resolved measurements of the temperature, the pH, $O_2$ and/or $CO_2$ concentration. In an alternative embodiment, more than one sensor 80 can be positioned in or above a measurement cavity 10a.

Furthermore, the apparatus 100 can comprise an optical detection device 84. It is configured and aligned in such a way that it can at least detect the deformation of the associated cantilever 22. Advantageously, it is aligned in such a way that a deformation of the cantilever 22 as well as the sample 110 connected to the cantilever 20 can be detected/recognized by the optical detection device 84. In particular, the optical detection device 84 comprises an optical sensor, and may be formed as a camera or comprise a camera.

The optical detection device 84 can be connected with an analyzing device 86. The analyzing device 86 is configured to receive, process and/or store the data provided by the optical detection device 84.

In an embodiment of the present invention, at least the analyzing device 86 and the control unit 82 are connected such that an easy processing and/or analysis of received, processed and/or stored data provided by the at least one sensor 80 and the optical detection device 84 is enabled. Alternatively, the invention comprises a device that combines the analyzing device 86 and the control unit 82 in itself.

A tube 40 can connect the first cylinder 32 and a second cylinder 42. The second cylinder 42 can be part of a second cylinder-piston-unit 42, 43 that can also comprise a second piston 43. The second piston 43 is also referred to as driving piston.

A first operating volume 90 which can be part of the first cylinder 32 can be restricted by the first piston 33; a second operating volume 92 which can be part of the second cylinder 42 can be restricted by the second piston 43. A total operating volume 94 can comprise the first and the second operating volume 90, 92. Particularly, the total operating volume 94 can be filled with a hydraulic fluid.

The second piston 43 can be connected with the syringe pump 70 which can be configured to realize a displacement of the driving piston 43. The hydraulic fluid can provide a particularly lossless transmission of the displacement of the driving piston 43 to a respective displacement of the first piston 33 and subsequently to a compression and/or stretching of the sample 110.

Furthermore, the syringe pump 70 can be connected with a control device 72. The control device 72 can be configured to control the motion of the driving piston 43 and hence to control the displacement of the first piston 33, in particular the amplitude and the frequency of the displacement. In an embodiment, the algorithm that controls the displacement is translated from standard G-code.

According to an embodiment of the present invention, the control device 72 can be configured to track the displacement of the driving piston 43 and the displacement of the first piston 33. In particular, in an embodiment, the control device 72 can compare the displacement of the driving 43 and the first piston 33 to control whether a movement of the driving piston 43 is appropriately transferred to a movement of the first piston 33 and consequently also corresponds to the mechanical stimulus applied to the sample 110.

FIGS. 6 and 7 show schematic side views of an apparatus 100 in that the force sensing device 20 is arranged such that the cantilever 22 extends perpendicular to the first plane 52, i. e. the first direction 50 extends perpendicular to the first plane 52. This configuration can also be referred to as vertical orientation. The holding element 34 (e.g. comprising a rod 36) extends parallel to the cantilever 22. FIGS. 8-13 show different views of parts of an apparatus according to the invention. In FIGS. 11-13 different views of (parts of) a frame 1 arranged on a container device 120 are presented. The container device 120 can be a microplate 62. In an embodiment, the microplate 62 can be a 6-well-plate, a 12-well-plate, a 24-well-plate, a 48-well-plate or a 96-well-plate. In FIGS. 11 to 13, exemplarily a 24-well-plate is shown.

FIG. 6 shows an embodiment, in that the apparatus 100 comprises a cantilever 22 and a holding element 34 that both extend into the same well/dish 60. In FIG. 7 an embodiment is presented in that the apparatus 100 comprises a plurality of cantilevers 22 and a plurality of holding elements 34 that extend into a plurality of wells/dishes 60, e. g. wells 60 of a microplate 62, wherein each one cantilever 22 and one holding element 34 extend in each one well 60 of the container device 120.

The apparatus 100 can comprise a frame 1 that can comprise a contact surface 2. The frame 1 can be arranged on the container device 120 which can comprise an upper side 122. The frame 1 can be arranged such on the container device 120 that the contact surface 2 can be arranged on the upper side 122.

The frame 1 can have a substantially rectangular shape. In an embodiment, the frame 1 can comprise a ridge 140 that can run between two opposing sides of the frame 1 (FIGS. 8, 9, 13). According to the invention, the frame 1 can comprise a plurality of ridges 140. The ridges 140 can run in parallel to each other. A ridge 140 can comprise a mounting 142, wherein the mounting 142 is configured such that a cantilever 22 can be mounted at the ridge 140 via the mounting 142. In an embodiment, a ridge 140 comprises a plurality of mountings 142. The distance between each two neighbouring mountings 142 on a ridge 140 can be equal.

The cantilever 22 can be arranged at the frame 1, in particular at the ridge 140 and can extend into a well 60 when the frame 1 is arranged on the container device 120.

The actuator 30 can comprise a beam 150. In an alternative embodiment, the beam 150 can be connected to the actuator 30. In an embodiment, the beam 150 can be screwed to the actuator 30.

The beam 150 can comprise a holding element 34. In an embodiment, the beam 150 can comprise an arm 152. Via an arm 152, the holding element 34 can be mounted to the beam 150. In particular, the beam 150 can comprise a plurality of arms 152.

Particularly, the number of arms 152 arranged at a beam 150 can be equal to the number of mountings 142 arranged at a ridge 140. An arm 152 and a mounting 142 can be arranged such that said arm 152 and said mounting 142 can be located above a shared well 60 of the microplate 62 on that the frame 1 can be arranged on (FIG. 13).

When the frame 1 is arranged on a microplate 62, the individual wells 60 of said microplate 62 can form the respective measurement cavities 10. The frame 1 and the beam 150 can be configured such that when the frame 1 is positioned on a microplate 62, the mountings 142 associated to one ridge 140 can be positioned above the wells 60 of one row or one column of the microplate 62 (FIG. 13).

According to the invention, the holding element 34 can be arranged such that the beam 150 extends parallel to the first plane 52 (or perpendicular to the first direction 50).

The actuator 30 is configured to move the beam 150. By moving the beam 150, the actuator 30 also moves the holding elements 34 related to that beam 150. Hence, by moving one beam 150, the actuator 30 can move a plurality of holding elements 34. The plurality of holding elements 34 connected to the same beam 150 can be moved identically, in particular they can be moved with the same frequency and amplitude. This means that all holding elements 34 associated with the same beam 150 can mediate identical mechanical stimuli to the respective connected samples.

In an embodiment, the frame 1 can be configured such that the beam 150 can be arranged at the frame 1. In particular, a beam 150 can extend parallel to a ridge 140.

The frame 1 can comprise a frame recess 160, an orifice 162 (FIG. 11) and a hole 164 (FIGS. 8, 9). The frame recess 160, the orifice 162 and the hole 164 can be in alignment with each other and be configured and arranged such that an actuator 30 (and a beam 150) can be arranged at the frame 1.

The frame recess 160 can be configured such that the actuator 30, in particular the first cylinder-piston unit 32, 33 can at least partially be inserted into the frame recess 160.

The beam 150 can be arranged at the hole 164 and can pass the orifice 162 such that the beam 150 and the actuator 30 can be connected. The orifice 162 and the beam 150 can be configured such that the beam 150 can slide within the orifice 162. Hence, the beam 150 can be a sliding part connected to the frame 1 by a sliding constraint.

The beam 150 can comprise or consists of a polymer e. g. polyactide (PLA) or a resin, e. g. stereolithography resin. Alternatively, the beam 150 can comprise or consists of stainless steel.

FIG. 6 shows an embodiment in that the cantilever 22 can act as an electrode 23. It is connected to a current source 200. The electric circuit can comprise a resistor 201.

An optical detection device 84 can be positioned below the dish 60 or the microplate such that at least the tip 26 of the cantilever 22 can be monitored by means of the optical detection device 84. Further, the optical detection device 84 can be connected to an analyzing device 86. The actuator 30 can be driven by a syringe pump 70.

A lid 170 can be arranged on the frame 1, particularly such that the lid 170 can close the apparatus 100 (FIG. 7).

In FIG. 14 an attachment of a sample 110 to a cantilever 22 and a holding element 34 is illustrated. The cantilever 26 and the holding element 34 can comprise or be formed out of a conductive material.

In an embodiment, the holding element 34 can comprise a fixed end and a non-fixed end that is also referred to as tip 35 of the holding element 34.

A sample 110, in particular a sample in a hydrogel 112, can be arranged at the holding element 34 and the cantilever 22, in particular such that the sample 110 extends essentially parallel to the first plane 52. The hydrogel 112 can be arranged such that it is located close to the tip 26 of the cantilever 22 as well as close to the tip 35 of the holding element 34. Particularly, the hydrogel 112 can be arranged such that it surrounds the tip 26 of the cantilever 26 and the tip 35 of the holding element 34.

The cantilever 22 and the holding element 34 can be partially insulated. The partial insulation of the cantilever 22 and/or the holding element 34 can be provided by a partial coating 180 of the conductive part of the cantilever 27 and/or the conductive part of the holding element 37. The partial coating 180 can be a plastic partial coating 180. Partial coating of the conductive part of the cantilever means that a section of the conductive part of the cantilever is accessible, i. e. not covered by a coating. This section of the cantilever 22 is also referred to as non-insulated section 28 of the cantilever 22. Likewise, a non-insulated section 29 of the holding element 34 can exist that is not covered by a coating.

The non-insulated section 28 of the cantilever 22 can be located close to the tip 26 of the cantilever 22. The non-insulated section 29 of the holding element 34 can be close to a tip 35 of the holding element 34.

A sample 110, in particular a sample 110 comprising a hydrogel 112, can be arranged at the cantilever 22 and the holding element 34 such that it can be in contact with the non-insulated section 28 of the cantilever 22 and the non-insulated section 29 of the holding element 34.

In an alternative embodiment (as e. g. presented in FIG. 4), neither the cantilever 22 nor the holding element 34 are insulated.

LIST OF REFERENCE NUMERALS 1 frame
2 contact surface
3 outer boundary
5 recess
6 protuberance/protrusion
7 layer of rubber
8; 8a, 8b, 8c, 8d through-opening
9a, 9b, 9c, 9d wall (of the through-opening)
10, 10a, 10b, 10c, 10d measurement cavity
15, 15a, 15b, 15c, 15d lateral wall (of the measurement cavity)
17 bottom (of measurement cavity)
20 force sensing device
22 cantilever
23 electrode
24 attachment device
25 slot
26 tip (of the cantilever)
27 conductive part (of the cantilever)
28 non-insulated section (of the cantilever)
29 non-insulated section (of the holding element)
30 actuator
32 first cylinder
33 first piston
34 holding element
35 tip (of the holding element)
36 rod
37 conductive part (of the holding element)
38 hydraulic connection piece
39 internal thread
40 tube
42 second cylinder
43 second piston/driving piston
44 second connection piece
50 first direction
52 first plane
60 dish/well
62 microplate
70 syringe pump
72 control device
80 sensor
82 control unit
84 optical detection device
86 analyzing device
88 stage of a microscope
90 first operating volume
92 second operating volume
94 total operating volume
100 apparatus
110 sample
112 hydrogel
120 container device
122 upper side (of the container device)
130 receptacle (of the container device)
140 ridge
142 mounting
150 beam
152 arm
160 frame recess
162 orifice
164 hole
142 coating
170 lid
180 partial coating
200 current source
201 resistor

The invention claimed is:

1. Apparatus (100) for determining properties of a sample (110) arranged in at least one receptacle (130) of a container device (120) comprising:

an actuator (30) which is configured to be coupled to the sample (110) via at least one holding element (34) which is configured to hold the sample (110), wherein the actuator (30) is configured to apply a mechanical stimulus to the sample (110) via the at least one holding element (34), a force sensing device (20) which is configured to be coupled to the sample (110) via at least one cantilever (22), a frame (1), wherein the actuator (30) and the force sensing device (20) are configured to be mounted to the frame (1), and wherein the frame (1) is configured to be arranged on the container device (120), wherein when the actuator (30) and the force sensing device (20) are mounted to the frame (1) the at least one holding element (34) and the at least one cantilever (22) are arranged in the at least one receptacle (130) when the frame (1) is arranged on the container device (120), wherein the at least one holding element (34) comprises a bending stiffness which is greater than a bending stiffness of the at least one cantilever (22).

2. Apparatus (100) according to claim 1, characterized in that the frame (1) comprises a contact surface (2), wherein the contact surface (2) is configured to be arranged on an upper side (122) of the container device (120) when the frame (1) is arranged on the container device (120), wherein the force sensing device (20) and the actuator (30) are mountable to the frame (1) such that the at least one cantilever (22) and the at least one holding element (34) are arranged in the at least one receptacle (130) of the container device (120) when the frame (1) is arranged on the container device (120).

3. Apparatus (100) according to claim 1, characterized in that the frame (1) comprises at least one through-opening (8a, 8b, 8c, 8d), wherein the at least one through-opening (8a, 8b, 8c, 8d) is limited by a wall (9a, 9b, 9c, 9d), wherein the wall (9a, 9b, 9c, 9d) forms a lateral wall (15a, 15b, 15c, 15d) of at least one measurement cavity (10a, 10b, 10c, 10d) when the frame (1) is arranged on the container device (120).

4. Apparatus (100) according to claim 1, characterized in that the frame (1) comprises at least four through-openings (8a, 8b, 8c, 8d), wherein each through-opening (8a, 8b, 8c, 8d) is limited by each one wall (9a, 9b, 9c, 9d), wherein each wall (9a, 9b, 9c, 9d) forms a lateral wall (15a, 15b, 15c, 15d) of at least one measurement cavity (10a, 10b, 10c, 10d) when the frame (1) is arranged on the container device (120).

5. Apparatus (100) according to claim 3, characterized in that the frame (1) is configured to be placed on a container device (120) in form of a dish (60) such that the dish (60) forms a bottom (17) of the at least one measurement cavity (10a, 10b, 10c, 10d) or the at least four measurement cavities (10a, 10b, 10c, 10d) when the frame (1) is arranged on the container device (120).

6. Apparatus (100) according to claim 1, characterized in that the frame (1) is configured to be placed on a container device (120) in form of a microplate (62), wherein the microplate (62) comprises a plurality of receptacles (130), and wherein the at least one holding element (34) and the at least one cantilever (22) are arranged in one receptacle (130) of the plurality of receptacles (130) of the microplate (62) when the frame (1) is arranged on the container device (120), that the apparatus (100) comprises a plurality of cantilevers (22) and a plurality of holding elements (34) that extend into the plurality of receptacles (130) of the microplate (62), wherein each one cantilever (22) and one holding element (34) extend in each one receptacle (130).

7. Apparatus according to claim 6, characterized in that the frame (1) comprises a plurality of ridges (140) running between two opposing sides of the frame (1), wherein each ridge (140) comprises a plurality of mountings (142), wherein the mountings (142) are configured such that a cantilever (22) can be mounted at the ridge (140) via a respective mounting (142).

8. Apparatus according to claim 6, characterized in that the actuator (30) comprises a beam (150) or a beam (150) is connected to the actuator (30), wherein the beam (150) comprises a plurality of arms (152) configured such that a respective holding element (34) can be mounted to the beam (150) via a respective arm (152), such that the actuator (30) is configured to move a plurality of holding elements (34) connected to the beam (150) identically.

9. Apparatus (100) according to claim 8, characterized in that the frame (1) comprises a frame recess (160), an orifice (162) and a hole (164), which are in alignment with each other and arranged such that a respective actuator (30) and a respective beam (150) are arrangeable at the frame (1) by means of the frame recess (160), the orifice (162) and the hole (164), wherein the respective beam (150) is arrangeable at the hole (164) and configured to pass the orifice (162), such that the respective beam (150) and the respective actuator (30) can be connected.

10. Apparatus (100) according to claim 1, characterized in that the at least one cantilever (22) is configured to be coupled to the sample (110) such that the at least one cantilever (22) is deformed by a force exerted by the sample (110) on the at least one cantilever (22) in response to the mechanical stimulus.

11. Apparatus (100) according to claim 1, characterized in that the force sensing device (20) comprises an optical detection device (84) for detecting the deformation of the at least one cantilever (22).

12. Apparatus (100) according to claim 1, characterized in that the apparatus (100) comprises an analyzing device (86) for processing and/or storing data provided by the force sensing device (20) to determine the force exerted by the sample (110) on the at least one cantilever (22).

13. Apparatus (100) according to claim 1, characterized in that the at least one cantilever (22) forms an electrode (23) enabling the application of an electrical stimulus to the sample (110).

14. Apparatus (100) according to claim 1, characterized in that the at least one cantilever (22) comprises a material that is pseudoelastic.

15. Apparatus (100) according to claim 1, characterized in that the at least one cantilever (22) comprises a material different from the material the at least one holding element (34) comprises.

16. Apparatus (100) according to claim 1, characterized in that the at least one holding element is formed from stainless steel.

17. Apparatus (100) according to claim 1, characterized in that the apparatus (100) comprises at least one sensor (80) arranged in or above the at least one receptacle (130) or arranged in or above the at least one measurement cavity (10a, 10b, 10c, 10d), wherein the at least one sensor (8asure at least one of: the temperature, pH, oxygen ($O_2$) concentration, nitrogen ($N_2$) concentration and/or carbon dioxide ($CO_2$) concentration of a milieu surrounding the sample (110).

18. Apparatus (100) according to claim 1, characterized in that the apparatus (100) is configured to be arranged on a stage of a microscope (88).

19. System (1000) for determining properties of a sample (110) comprising an apparatus (100) according to claim 1 and a container device (120), wherein the container device (120) is a dish (60) or a microplate (62).

20. A method for determining properties of a sample (110) using an apparatus (100) according to claim 1, wherein
- a sample (110) is coupled to the at least one holding element (34) and to the at least one cantilever (22), and
- the frame (1) is arranged on a container device (120).

* * * * *